United States Patent [19]

Katchman et al.

[11] 3,994,856

[45] Nov. 30, 1976

[54] COMPOSITION OF A POLYPHENYLENE ETHER AND A BLOCK COPOLYMER OF A VINYL AROMATIC COMPOUND AND A CONJUGATED DIENE

[75] Inventors: Arthur Katchman, Delmar, N.Y.; Robert M. Summers, Birmingham, Mich.

[73] Assignee: General Electric Company, Pittsfield, Mass.

[22] Filed: Feb. 24, 1975

[21] Appl. No.: 552,214

Related U.S. Application Data

[63] Continuation-in-part of Ser. No. 414,535, Nov. 9, 1973, abandoned, which is a continuation of Ser. No. 201,104, Nov. 22, 1971, abandoned.

[52] U.S. Cl. .......................... 260/42.47; 260/876 B
[51] Int. Cl.² ..................... C08K 3/40; C08L 53/02
[58] Field of Search .......... 260/42.47, 876 B, 47 ET

[56] References Cited

UNITED STATES PATENTS

| 3,639,508 | 2/1972 | Kambour | 260/876 B |
| 3,660,531 | 5/1972 | Lauchlan et al. | 260/876 B |

OTHER PUBLICATIONS

Modern Plastics Encyclopedia 1968 (McGraw–Hill) (N.Y.) (Sept. 1967), pp. 241–244.

*Primary Examiner*—Donald E. Czaja
*Assistant Examiner*—H. H. Fletcher
*Attorney, Agent, or Firm*—William F. Mufatti; Edward A. Hedman

[57] ABSTRACT

There are provided compositions comprising (a) a polyphenylene ether, (b) an elastomeric block copolymer and (c) a high impact rubber modified polystyrene resin or a blend of a high impact rubber modified polystyrene resin and a homopolystyrene resin.

11 Claims, No Drawings

COMPOSITION OF A POLYPHENYLENE ETHER AND A BLOCK COPOLYMER OF A VINYL AROMATIC COMPOUND AND A CONJUGATED DIENE

CROSS REFERENCE TO RELATED APPLICATIONS

This application is a continuation-in-part of application Ser. No. 414,535 filed Nov. 9, 1973 now abandoned which is a continuation of application Ser. No. 201,104, filed Nov. 22, 1971 now abandoned.

This invention relates to novel resin compositions and more particularly, to polymer compositions comprising a polyphenylene ether, an elastomeric block copolymer of a vinyl aromatic compound and a conjugated diene and, optionally, a polystyrene homopolymer or random copolymer resin.

BACKGROUND OF THE INVENTION

The polyphenylene ethers are known and described in numerous publications including Hay, U.S. Pat. Nos. 3,306,874 and 3,306,875 and Stamatoff U.S. Pat. Nos. 3,257,357 and 3,257,358. The high molecular weight polyphenylene ethers are high performance engineering thermoplastics possessing relatively high melt viscosities and softening points — i.e., in excess of 275° C., and are useful for many commercial applications requiring high temperature resistance including formation of films, fibers and molded articles.

Although they have the above-described desirable properties, it is also known that certain properties of the polyphenylene ether resins are undesirable for some commercial uses. For example, parts molded from the polyphenylene ethers are somewhat brittle due to poor impact strength. In addition, the relatively high melt viscosities and softening points are considered a disadvantage for many uses. Films and fibers can be formed from polyphenylene ether resins on a commercial scale using solution techniques, but melt processing is commercially unattractive because of the high temperatures required to soften the resin and the problems associated therewith such as instability, discoloration and the requirement for specially designed process equipment to operate at elevated temperatures. Molded articles can be formed by melt processing techniques, but, again, the high temperatures required are undesirable.

It is known in the art that properties of the polyphenylene ether resins can be materially altered by blending them with other resins. For example, one method for improving the melt processability of the polyphenylene ethers is disclosed in a commonly-assigned patent, U.S. Pat. No. 3,379,792, incorporated herein by reference. According to this patent, flow properties of the polyphenylene ethers are improved by blending with from about 0.1 to 25 parts by weight of a polyamide. In another commonly-assigned patent, U.S. Pat. No. 3,361,851, a polyphenylene ether composition comprising a polyphenylene ether blended with a polyolefin is disclosed. The polyolefin is added to improve impact strength and resistance to aggressive solvents. In a third commonly-assigned patent, Cizek, U.S. Pat. No. 3,383,435, there are provided means for simultaneously improving the melt processability of the polyphenylene ether resins while simultaneously up-grading many properties of polystyrene homopolymer and random copolymer resins. The invention of the Cizek patent is based upon the discovery that the polyphenylene ether resins and such polystyrene resins, including rubber modified polystyrene resins, are combinable in all proportions and result in compositions having many properties improved over those of either of the components.

One preferred embodiment of the Cizek patent is a composition comprising a high-impact, rubber reinforced polystyrene and a poly(2,6-dialkyl-1,4-phenylene)ether. This composition was preferred because it provides the aforementioned objectives of improving the melt-processability properties of the polyphenylene ether resin and provides the further advantage of improving impact resistance of parts molded from the blend. Furthermore, the Cizek composition of the polyphenylene ether and the high impact polystyrene could be custom-formulated to provide predetermined properties ranging between those of the polystyrene and those of the polyphenylene ether by controlling the ratio of the two polymers. The reason for this is that the blend exhibits a single set of thermodynamic properties rather than two distinct sets of properties — i.e., one for each of the components of the blend as is typical with blends of prior art.

The styrene resins disclosed in the Cizek patent are either homopolymers or random copolymers. For example, the crystal polystyrenes of Examples 1 and 9 are homopolymers. Lutrex HT-88 of Example 7 is a commercial styrene grafted butadiene rubber modified high impact polystyrene. In such products a portion of the styrene is homopolymerized into side chains onto a rubber backbone. The styrene containing copolymer resins disclosed in Cizek, Col. 3, are random copolymers: styrene acrylonitrile, styrene-butadiene, styrene-acrylonitrile- α-alkyl styrene copolymers, styrene-acrylonitrile-butadiene (ABS), copolymers of ethylvinyl benzene and divinyl benzene and the like. With the exception of styrene-acrylonitrile- α-methyl styrene, Example 17, none of the Cizek terminology can be construed to disclose a block copolymer of the A-B-A' 1 type. Because the monomers are grafted into terminal blocks, instead of side chains, A-B-A' block copolymers are more linear and their properties differ markedly from the grafted rubber copolymers used in Cizek. Moreover, because there is no disclosure of any copolymer with an elastomeric center block, the Cizek compositions do not include combinations of polyphenylene ethers with elastomeric block copolymers of vinyl aromatic compounds and conjugated dienes.

With respect to the preferred embodiments in the Cizek patent, it is believed that the impact resistance of the polyphenylene ether is improved because of the diene rubber content in the random grafted high-impact polystyrene and in the ABS resin and, in this respect, the improvement in impact strength appears to be directly proportional to the diene rubber content of the polystyrene resin or the ABS resin, increasing concentrations of diene rubber resulting in increased impact strength. However, it has also been found — as a disadvantage — that the gloss of parts molded from the polyphenylene ether resin and the high-impact polystyrene resin is inversely proportional to the diene rubber content and that, therefore, as the diene rubber content is increased, gloss and surface appearance of the molded parts are decreased. Consequently, increasing the diene rubber content of the compositions results in increased impact strength, but with a sacrifice in surface appearance and gloss. Alternatively, reduction in diene rubber content such as by the use of unreinforced (crystal) polystyrene results in parts having good gloss, but at a sacrifice in impact strengths. Because both impact strength and gloss are commercially important properties in the manufacture of molded parts, although the preferred compositions of the Cizek patent provide the advantages noted above, it has been found difficult to provide compositions having both optimum impact strength and surface appearance.

Also, as mentioned above, the polyphenylene ether-styrene resin compositions of the Cizek patent were disclosed only to be improved in resistance to aggressive organic solvents, by copolymerization of the styrene resin with an alkenyl cyanide compound, e.g. acrylonitrile (Examples 10–12). Therefore, the need still exists for means to more easily provide compositions with outstanding resistance to gasoline.

The Lauchlan patent, U.S. Pat. No. 3,660,531, discloses blends of polyphenylene ether resins, elastomeric block copolymers and polystyrene resins. The compositions taught by Lauchlan have a polyphenylene ether-alkenyl aromatic resin matrix that constitutes greater than 50% of the blend, with a proviso that the ratio of polyphenylene ether resin to alkenyl aromatic resin is always greater than 1. Applicants have discovered that the compositions, wherein the ratio of polyphenylene ether resin to alkenyl aromatic resin is less than 1, have a lower melt viscosity and are more stable than the Lauchlan type compositions. The compositions of the present invention have good impact strengths which make then useful for many molding applications. In addition the compositions which contain at least about 10% by weight of the elastomeric block copolymer are resistant to attack by aggressive solvents such as gasoline. These compositions may also be reinforced with fibrous glass with enhancement in properties and no loss of excellent resistance to gasoline environments. All such compositions have good impact strengths and good resistance to distortion by heat.

DESCRIPTION OF THE INVENTION

According to the present invention, there are provided normally solid thermoplastic compositions which comprise:

a. from 5 to 45% by weight of a polyphenylene ether resin;

b. from 40 to 85% by weight of a high impact rubber modified polystyrene resin or a mixture of a high impact rubber modified polystyrene resin and a homopolystyrene resin; and c. from 5 to 25% by weight of an elastomeric block copolymer of a vinyl aromatic compound (A) and (A)' and a conjugated diene (B), of the A-B-A' type, the center block B being of higher molecular weight that of the combined terminal blocks A and A'.

Preferred compositions will be those in which the polyphenylene ether resin comprises from 10 to 35%, most preferably 10 to 20% by weight of the total resinous components in the composition.

It is to be understood, however, that the present compositions can also include conventional amounts of conventional additives for processability, flame retardancy, stability and the like.

Preferred features of this invention are reinforced compositions containing reinforcing amounts of reinforcements, such as powders, whiskers, fibers or platelets of metals, e.g., aluminum, bronze, iron or nickel, and non-metals, e.g., carbon filaments, acicular $CaSiO_3$, asbestos, $TiO_2$, titanate whiskers, glass flakes and fibers and the like. Such reinforcements will be present in an amount of, e.g., 2 to 90% by weight, preferably 10 to 60% by weight. Especially preferred as a reinforcement is fibrous glass.

In preferred compositions the polyphenylene ether resins in component (a) will be those having repeating structural units of the formula

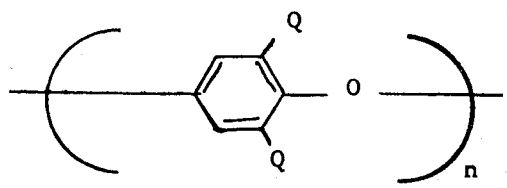

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus. The preparation of polyphenylene ether resins corresponding to the above formula is described in the abovementioned patents of Hay and Stamatoff. Especially preferred polyphenylene ether resins for purposes of the present invention are those having alkyl substitution in the two positions ortho to the oxygen ether atom — i.e., where each Q is alkyl, most preferably, having from 1 to 4 carbon atoms. The most preferred polyphenylene ether resin for purposes of the present invention is poly(2,6-dimethyl-1,4-phenylene)ether (each Q is methyl).

With respect to component (b), elastomeric block copolymers of vinyl aromatic compounds and conjugated dienes are made by means well known in the art and are also available commercially from a number of sources.

Block copolymers of vinyl aromatic compounds and conjugated dienes are described in Kennedy, et al Editor, Polymer Chemistry of Synthetic Elastomers, Interscience, Vol. 23, Part II, 1969, pages 553–559. In general, they will be of the A-B-A' type in which the center and end blocks can vary. In the compositions of this invention, the central block, B, will always be that of a conjugated diene, e.g., butadiene; isoprene; 1,3-pentadiene; 2,3-dimethyl-butadiene, and the like or mixtures of the foregoing. The terminal blocks A and A', will be the same or different, but will always be derived from a vinyl aromatic compound, e.g., styrene, α-methyl styrene, vinyl toluene, vinyl xylene, vinyl naphthalene, or mixtures of any of the foregoing. In the most preferred compositions, the block copolymer will have terminal blocks A and A' comprised of polystyrene and center block B comprised of polybutadiene.

The ratio of the comonomers can vary broadly, so long as the molecular weight center block is greater than that of the combined terminal blocks. This appears to be necessary for the impact strength and solvent resistance to be maximized. Preferably, with the above limitation, the molecular weight of the terminal blocks each will range from about 2000 to about 100,000, while that of the center block will range from about 25,000 to about 1,000,000.

The block copolymers are made by an organometallic initiated polymerization process using, for example sodium or lithium metal an organic derivative thereof. The diene monomers can be polymerized with a monofunctional or difunctional initiator, as is described in Kennedy et al., mentioned above.

In one process, the block copolymer is prepared by dissolving the conjugated diene, e.g., butadiene, in an aromatic hydrocarbon solvent, e.g., xylene, toluene, etc., and adding 0.3 to 7.5 millimoles/100 parts of monomer of an organodilithium initiator, e.g., dilithiobutane, dilithiostilbene, etc. Polymerization of the diene is completed and then the vinyl aromatic compound is added and polymerization of this is completed to form the block copolymer. The product is precipitated and deactivated, e.g., with alcohol, such as ethanol or isopropanol and purified by redissolving in hydrocarbon and reprecipitating with alcohol.

Full descriptive details of such a process are given in Zelinski, U.S. Pat. No. 3,251,905, incorporated herein by reference.

In another process, the block copolymer is built up sequentially using, e.g., a secondary or tertiary alkyl lithium compound at about 100–200 parts per million based on the total weight of the monomers and a polymerization temperature in the range 20°–65° C. For example, styrene is dissolved in cyclohexane at 32° C. and treated with 5530 parts per million of secondary butyl lithium. After polymerization is complete, isoprene is injected and polymerization is continued at 55°–57° C. Finally styrene is added and the third block is polymerized. The product can be recovered as described above.

Full descriptive details of such a process are given in Holden et al, U.S. Pat. No. 3,231,635.

Such styrene-butadiene-styrene block copolymer resins alone and blended with rubber modified styrene resins are also available commercially, e.g., as Kraton X-4119, K-1102, K-1101, XT-0135 and XT-0401 or K-1107 and K-1108 (styrene-isoprenestyrene) from Shell Chemical Company, Polymers Division.

As noted above, the elastomeric block copolymer resin may be added to a polyphenylene ether resin or to a composition of a polyphenylene ether resin with an additional resin, preferably a rubber modified high impact polystyrene resin. As disclosed in the above-mentioned Cizek patent, the styrene resin most readily combinable with the polyphenylene ether resin is one having at least 25% by weight polymer units derived from vinyl aromatic monomer having the formula

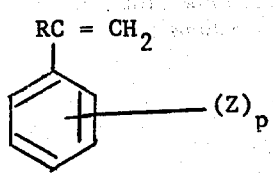

where R is hydrogen, alkyl of 1 to 4 carbon atoms or halogen; Z is a member selected from the class consisting of vinyl, hydrogen, or alkyl of from 1 to 4 carbon atoms; and $p$ is from 1 to 5. Such compositions will comprise from 10 to 35% by weight of the polyphenylene ether component and from 40 to 85% by weight of the rubber modified high impact polystyrene resin. The preferred resin for purposes of this invention is one comprising either a styrene homopolymer or a rubber modified polystyrene, e.g., blended or grafted with from about 3 to 30, preferably from 4 to 12% by weight of a polybutadiene or a rubbery random copolymer, e.g., of about 70% butadiene and 30% styrene.

The amount of elastomeric block copolymer added to the polyphenylene ether resin and the rubber modified high impact styrene resin will vary from 5 to 25% by weight of the composition. The preferred composition will have more than 10% by weight of this component. Especially preferred are compositions that comprise 20% by weight of a polyphenylene ether resin as described hereinabove, —40% by weight of a high impact rubber modified styrene resin as described herein and 20% by weight of the elastomeric block copolymer.

It should be obvious that other additives may be present in the compositions such as plasticizers, pigments, flame retardants and stabilizers in amounts varying between about 1 and 30 percent by weight of the total composition. The abovestated range for the elastomeric block copolymer resin, the polyphenylene ether resin and, if present, the polystyrene resin, is based solely upon such resinous components in the polymer blend and excludes other additives.

The method of forming the polymer composition is not critical, prior art blending techniques being suitable. The preferred method comprises blending the polymers and additives, such as reinforcements in powder, granular and filamentous form — as the case may be — extruding the blend and chopping into pellets suitable for molding to shape by means conventionally used to mold normally solid thermoplastic compositions.

DESCRIPTION OF THE PREFERRED EMBODIMENTS

The advantages obtained by providing compositions of an elastomeric vinyl aromatic conjugated diene A-B-A' block copolymer resin with a polyphenylene ether resin in combination with rubber modified high impact polystyrene resin are illustrated in the following examples which are set forth as further description of the invention, but are not to be construed as limiting the invention thereto.

EXAMPLE 1

The following formulation is mechanically blended then co-extruded in a ¾ inch Wayne-type extruder and molded into test pieces in a 3 oz. Newbury injection molding machine. The block copolymer and the rubber modified polystyrene are masterbatched first. The physical tests are carried out by the following procedures: ⅛ inch notched Izod Impact Strength, ASTM D-256-56; Tensile strength and elongation, ASTM-D-639-61T. Extrusion and molding conditions and physical properties are as follows:

| Ingredients | Parts by weight |
|---|---|
| poly(2,6-dimethyl-1,4-phenylene) ether* | 20 |
| elastomeric block copolymer resin** | 40 |
| high impact rubber modified polystyrene resin*** | 40 |

*General Electric Company, PPO in powder form, intrinsic viscosity 0.40–0.65 dl./g.
**Kraton X4119, Shell Chemical Company, styrene-butadiene-styrene block copolymer (66% butadiene units-33% styrene units).
***Shell Polystyrene 324E, (12% polybutadiene rubber).

| Properties | |
|---|---|
| Izod impact (ft.lbs./in. notch) | 7.04 |
| Tensile yield strength (psi) | 4100 |
| Tensile ultimate strength (psi) | 3700 |
| Elongation, % | 24 |

EXAMPLE 2

The following formulation is blended, molded and tested by the procedure of Example 1. Blending, molding and property test data are as follows:

| Ingredients | Parts by weight |
|---|---|
| poly(2,6-dimethyl-1,4-phenylene) ether (as in Example 1) | 20 |
| elastomeric block copolymer resin (as in Example 1) | 20 |
| high impact rubber modified polystyrene resin (as in Example 1) | 20 |
| crystal polystyrene* | 40 |

*Monsanto HH-101 styrene homopolymer resin for molding purposes.

| Properties | |
|---|---|
| Izod impact (ft.lbs./in. notch) | 1.51 |
| Tensile yield strength (psi) | 6600 |
| Tensile ultimate strength (psi) | 5700 |
| Elongation, % | 21 |

These data demonstrate that part of the graft copolymer can be replaced with styrene homopolymer to give a thermoplastic composition with good impact resistance.

EXAMPLE 3

The following formulation is blended, molded and tested by the procedure of Example 1:

| Ingredients | Parts by weight |
|---|---|
| poly(2,6-dimethyl-1,4-phenylene) ether (as in Example 1) | 20 |
| elastomeric block copolymer resin (as in Example 1) | 30 |
| rubber modified styrene resin (as in Example 1) | 30 |
| fibrous glass reinforcement, ⅛ inch | 20 |

The reinforced composition has high tensile strength (8100 psi) and good elongation (7%) and impact strength (2.9 ft. lbs./in. notch).

To determine the environmental craze resistance of the present compositions, test pieces are placed under a 1% strain and immersed in gasoline at about 70° F. With the compositions of this invention that contain at least 10% by weight of the A-B-A' block copolymer, no crazing or cracking is seen after relatively prolonged periods, indicating excellent resistance to this aggressive solvent. The glass reinforced composition of Example 3 exhibits the same excellent resistance to attack by gasoline.

In contrast, the material prepared as above for comparison purposes — without at least 10% by weight of styrene-butadiene-styrene block copolymer — in addition to having poor notched Izod impact strength and poor tensile elongation, has very much less resistance to attack by gasoline, and shows catastrophic failure by cracking in five seconds under the same conditions.

EXAMPLE 4

The following compositions were prepared according to the procedure of Example 1:

| Ingredients | Parts by weight |
|---|---|
| A. poly(2,6-dimethyl-1,4-phenylene) ether (as in Example 1) | 15 |
| elastomeric block copolymer* | 5 |
| high impact rubber modified polystyrene resin** | 80 |

*Kraton K1101, Shell Chemical Company, styrene-butadiene-styrene block copolymer (66% butadiene units-33% styrene units).
**Foster Grant 834 (8% butadiene rubber)

| Properties | |
|---|---|
| Melt viscosity at 540° F & 1500 sec⁻¹(poise) | 1300 |
| Initial Yellowness Index (relative unitless dimension) | 20.4 |
| Change in Yellowness Index after 11 days exposure | 0.7 |

Following the procedures of Example 4, the compositions set forth in Table I were prepared and tested:

TABLE 1

| | poly(2,6-dimethyl-1,4-phenylene ether | elastomeric block* copolymer | rubber modified* high impact styrene |
|---|---|---|---|
| B. | 15 | 10 | 75 |
| C. | 15 | 15 | 70 |
| D. | 15 | 25 | 60 |
| E. | 35 | 5 | 60 |
| F. | 35 | 10 | 55 |
| G. | 35 | 15 | 50 |
| H. | 35 | 25 | 40 |

| | Melt Viscosity | Yellowness Index | Change In Yellowness Index |
|---|---|---|---|
| B. | 1400 | 20.0 | −0.2 |
| C. | 1550 | 20.2 | 0.9 |
| D. | 1675 | 20.3 | 2.9 |
| E. | 1840 | 28.2 | 15.2 |
| F. | 2050 | 28.1 | 17.2 |
| G. | 2280 | 28.1 | 18.9 |
| H. | 3000 | 42.0 | 9.6 |

*As described in Example 4; all materials in parts by weight

CONTROL EXAMPLE A

Following the same procedures of Example 4, the following compositions of Table 2 were prepared and tested:

TABLE 2

| | poly(2,6-dimethyl-1,4-phenylene)ether resin | elastomeric block copolymer | rubber modified high impact styrene resin |
|---|---|---|---|
| I | 55 | 5 | 40 |
| II | 55 | 10 | 35 |
| III | 55 | 15 | 30 |
| | Melt Viscosity | Yellowness Index | Change In Yellowness Index |
| I | 3300 | 32.9 | 31.1 |
| II | 3000 | 36.0 | 30.7 |
| III | 3900 | 44.8 | 24.4 |

A comparison of the results of Table 1 and Table 2 show that the compositions of the present invention have a lower melt viscosity, a lower yellowness index and are more stable than the control compositions of Table 2. The increase in stability may be seen from an evaluation of the changes observed from the initial yellowness index after exposure to light.

EXAMPLE 5

The procedure of Example 3 is repeated, substituting for the polybutadiene rubber modified high impact polystyrene resin, a rubbery butadiene-styrene copolymer (78% BD - 22% Styrene) modified polystyrene. A composition according to this invention is obtained.

The procedure of Example 3 is repeated, substituting for the block copolymer of polystyrene-polybutadiene-polystyrene, respectively, block copolymers of
polystyrene-polyisoprene-polystyrene
polystyrene-polyisoprene-poly(α-methylstyrene)

High impact compositions according to this invention are obtained.

The procedure of Example 3 is repeated, substituting for the block copolymer, block copolymers having the following indicated weight percent compositions.

| polystyrene-polybutadiene-polystyrene | 50 - 90 - 5 |
| polystyrene-polybutadiene-polystyrene | 10 - 80 - 10 |
| polystyrene-polybutadiene-polystyrene | 15 - 75 - 15 |
| polystyrene-polybutadiene-polystyrene | 12.5 - 75 - 12.5 |

High impact compositions according to this invention are obtained.

EXAMPLE 6

The following polyphenylene ethers are substituted for poly(2,6-dimethyl-1,4-phenylene)ether in the formulation of Example 3:
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether
poly(2-ethyl-6-propyl-1,4-phenylene)ether.

The final compositions have properties similar to those exhibited by the composition of Example 3.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A normally solid thermoplastic composition comprising:

a. from 5 to 45% by weight of the resinous components of the composition of a polyphenylene ether resin,
  b. from 40 to 85% by weight of the resinous components of the composition of a high impact rubber modified polystyrene resin or a blend of a high impact rubber modified polystyrene resin and a homopolystyrene resin with the proviso that the ratio of component (a) to component (b) is less then one; and
  c. from 5 to 25% by weight of the resinous components of the composition of an elastomeric block copolymer of a vinyl aromatic compound (A) and (A)' and a conjugated diene (B), of the A-B-A' type, the center block B being of higher molecular weight than that of the combined terminal blocks A and A'.

2. A composition as defined in claim 1 wherein component (a) is a polyphenylene ether of the formula

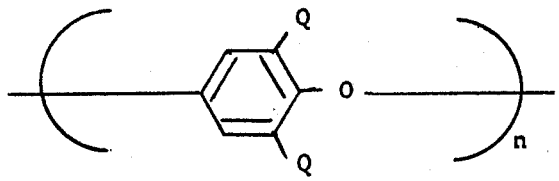

wherein the oxygen ether atom of one unit is connected to the benzene nucleus of the next adjoining unit; $n$ is an integer of at least 50; and each Q is a monovalent substituent selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

3. A composition as defined in claim 2 wherein each Q is alkyl having from 1 to 4 carbon atoms.

4. A composition as defined in claim 2 wherein each Q is methyl.

5. A composition as defined in claim 2 wherein said polyphenylene ether comprises at least 15% by weight of the total resinous components in said composition.

6. A composition as defined in claim 1 wherein, in component (c), (A) and (A)' are selected from styrene, α-methyl styrene, vinyl toluene, vinyl xylene and vinyl naphthalene and (B) is selected from butadiene, isoprene, 1,3-pentadiene or 2,3-dimethylbutadiene.

7. A composition as defined in claim 6 wherein, in component (c), (A) is a styrene block, (B) is a butadiene block and (A)' is a styrene block.

8. A composition as defined in claim 7 wherein, in component (c), terminal blocks A and A' have molecular weights of 2,000 to 100,000, respectively, and center block B has a molecular weight of from 25,000 to 1,000,000.

9. A normally solid thermoplastic composition which comprises:
a. 20% by weight of a polyphenylene ether of the formula

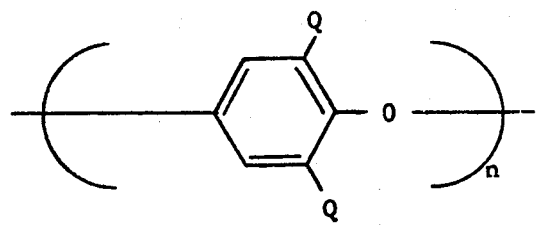

where Q is alkyl of from 1 to 4 carbon atoms and $n$ is an integer of at least 50;

b. 40% by weight of a high impact rubber modified styrene resin having at least 25% of the polymer units derived from a vinyl aromatic compound of the formula

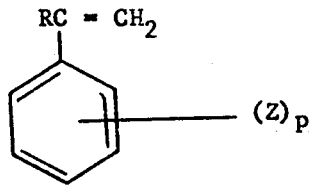

wherein R is hydrogen, alkyl of from 1 to 4 carbon atoms or halogen, Z is hydrogen, alkyl of from 1 to 4 carbon atoms or vinyl and $p$ is an integer of from 1 to 5; and c. 40% by weight of an elastomeric block copolymer of a vinyl aromatic compound (A) and (A)' and a conjugated diene (B), of the A-B-A' type, the center block B being of higher molecular weight than that of the combined terminal blocks A and A'.

10. A composition as defined in claim 9 wherein the rubber modified high impact styrene resin includes a diene rubber or a rubbery copolymer of butadiene and styrene in an amount of from about 4 to about 12% by weight of said resin.

11. A reinforced composition as defined in claim 1 including a reinforcing amount of fibrous glass.

* * * * *